May 9, 1933.  J. P. WALKER  1,908,581
OIL AND GAS SEPARATOR
Filed Aug. 13, 1930  2 Sheets-Sheet 2

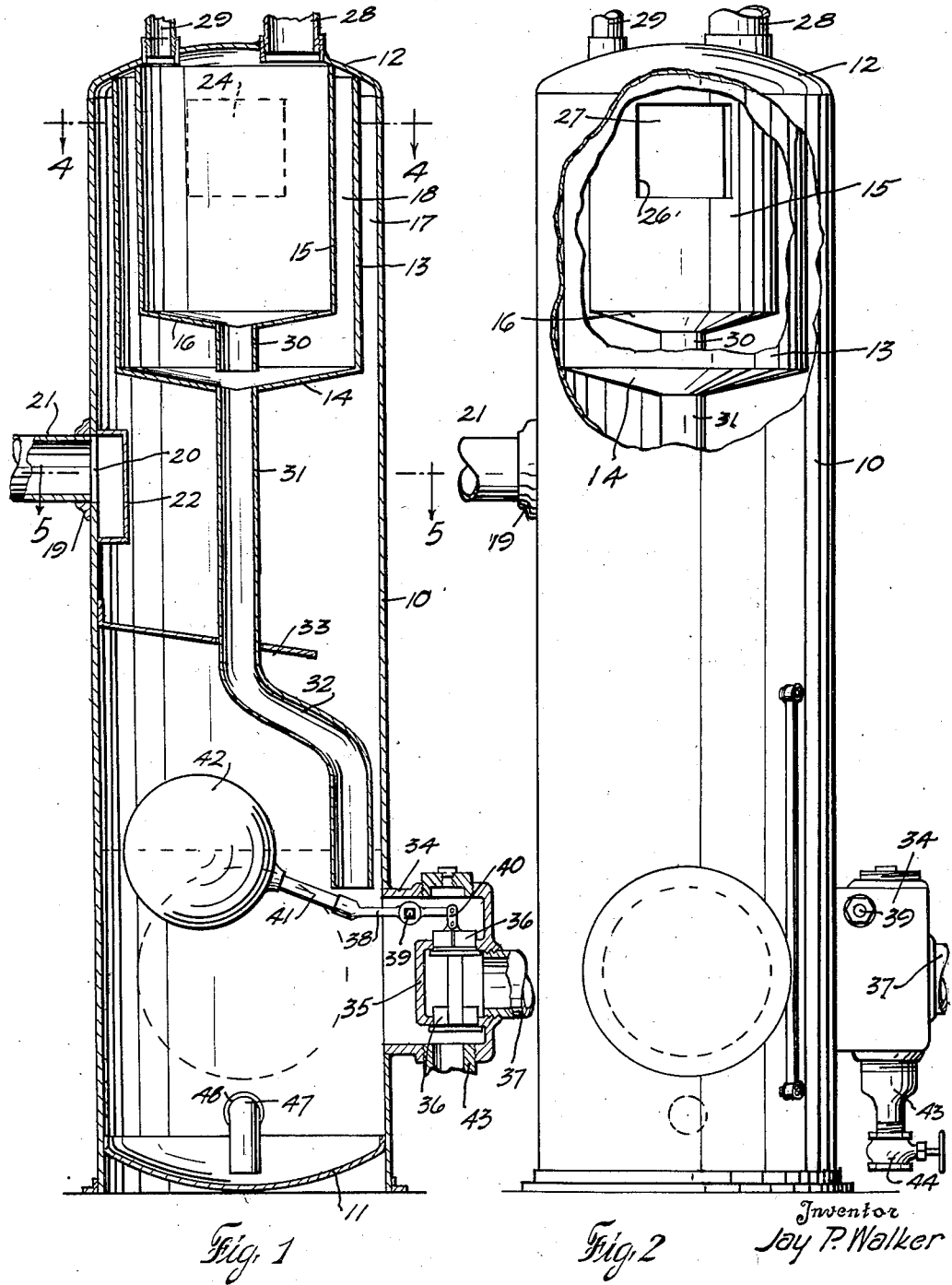

Inventor
Jay P. Walker

By
Jack A. Schley
Attorney

Patented May 9, 1933

1,908,581

UNITED STATES PATENT OFFICE

JAY P. WALKER, OF TULSA, OKLAHOMA, ASSIGNOR OF FORTY PER CENT TO GUY O. MARCHANT AND SIX PER CENT TO C. G. WELLS, BOTH OF TULSA, OKLAHOMA

OIL AND GAS SEPARATOR

Application filed August 13, 1930. Serial No. 475,027.

This invention relates to new and useful improvements in oil and gas separators.

One object of the invention is to provide a separator particularly adapted to handle small producing or flowing wells and wells which are being pumped.

A further object of the invention is to provide a separator of simple construction and operation and in which the number of parts are reduced to a minimum.

Another object of the invention is to provide a separator with unique and efficient baffling means, which while highly effective are neither expensive or difficult to install.

Still another object of the invention is to provide a flow diverter for the influent and a baffle below for preventing undue agitation of the settled liquids.

A construction designed to carry out the invention will be hereinafter described together with other features of the invention.

Figure 3:
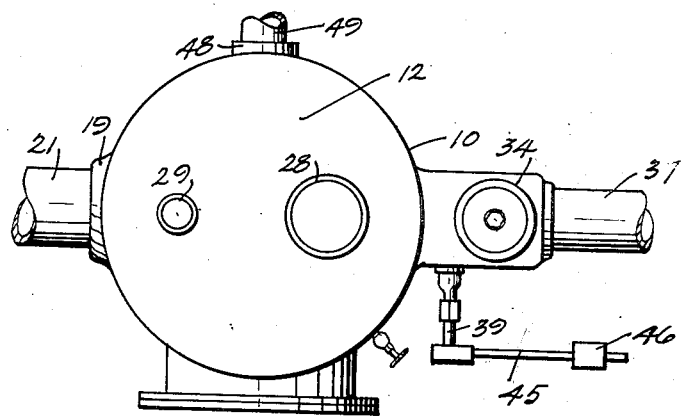
Figure 4:
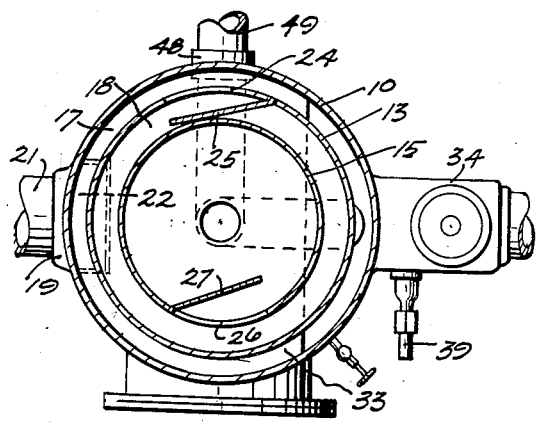
Figure 5:
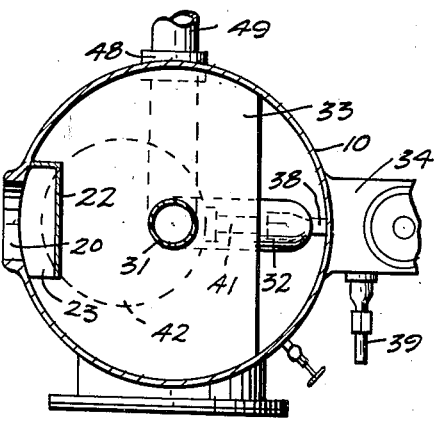

The invention will be more readily understood from a reading of the following specification and by reference to the accompanying drawings in which an example of the invention is shown, and wherein:

Figure 1 is a vertical sectional view of an oil and gas separator constructed in accordance with the invention, Figure 2 is a view of the same partly in section and partly in elevation, Figure 3 is a plan view, Figure 4 is a horizontal cross-sectional view taken on the line 4—4 of Figure 1, and Figure 5 is a horizontal cross sectional view taken on the line 5—5 of Figure 1.

In the drawings the numeral 10 designates an upright cylindrical metal tank of suitable construction having a false bottom 11 which is dished at a crowned top 12. A cylindrical shell 13 is suspended from the top 12 within the upper portion of the tank and has a hopper bottom 14. Within the shell 13 a smaller cylindrical shell 15 is also suspended from the top 12 and has a hopper bottom 16 spaced above the bottom 14.

The shells are disposed in concentric relation to each other and also to the tank. The outer shell 13 is spaced from the tank wall to form an annular scrubbing channel or space 17 extending vertically therebetween. A similar channel or space 18 is provided between the shells.

Below the shells a collar 19 surrounds an opening 20 in the side wall of the tank at about mid-height thereof. An influent pipe 21 is secured in the collar for discharging the oil and gas into the separator tank. In order to divert and direct the influent circumferentially of the tank, a diverter or deflector 22 is disposed on the inner wall of the tank so as to surround the opening 20. This diverter is a box-like structure having one vertical side 23 open as is indicated in Figure 5. It will be seen that the influent upon entering the diverter will strike the rear wall thereof whereby said influent will be deflected or turned and discharged through the opening 23. Owing to its velocity, the influent will pursue a circumferential path within the tank, tending to follow the inner circular wall thereof.

The tendency of the oils and other liquids will be to take a downward helical course owing to their specific gravity, while the lighter gaseous constitutents will tend to take an upward helical path. The oils and liquids will flow to the bottom of the tank and settle in the lower portion thereof, which portion constitutes a settling chamber. The liquids will tend to cling to the walls of the tank thus liberating the gases. While the velocity is not high, it will in most instances be sufficient to keep the fluids whirling within the tank and this whirling action will scrub out the liquids and free the gases whenever the fluids come in contact with the metal surfaces.

The upward moving fluids will take a helical path in the chamber 17, finally escaping through an opening or inlet 24 in the shell 13. A deflector 25 is directed inwardly from one vertical edge of this opening and rests against the shell 15, as is shown in Figure 4. This deflector causes the inflowing fluids to be directed circumferentially within the channel 18. The inner shell 15 has a similar opening 26 and baffle 27 diametrically opposite the opening 24. Owing to the constant pressure of the influent entering the tank from the pipe 21, there will be more or less expansion of the fluids within the channel 18 and particularly within the inner shell 15. This expansion will cause a drop in the pressure, thus aiding the separation. The liquids will be scrubbed out against the surfaces of the shells and tend to flow down the same to the bottoms 14 and 16, while the gases which are freed will continue flowing.

Gases rising to the top of the shell 15 will be substantially free from liquids and escape through a pipe 28 connected in the top 12. A safety valve (not shown) is connected by a pipe 29 in the top 12 within the shell 15. Such valves are common and act to release excessive pressures within the tank. A drain spout 30 depends from the center of the bottom 16 and overhangs a drain pipe 31 extending from the bottom 14. The liquids are drained from the shells by these conductors.

The pipe 31 is provided with an offset 32 at its lower end which extends below the oil level of the settling chamber of the tank so that gases above the oil level cannot enter the shells through said pipe. An inclined baffle and brace 33 extends from the wall of the tank under the diverter 22 and is penetrated by the pipe 31. This baffle is inclined downwardly. The baffle covers the major portion of the transverse area of the tank and prevents undue agitation of the settled oil lying below it by the the influent entering above it. Any fluids rising from the settled oil must pass under the lower lip of the baffle at the opposite side of the tank from the diverter.

The casing 34 of an oil discharge valve is secured in the side of the tank below the oil level and includes a valve box 35 in which valves 36 are mounted. A discharge pipe 37 leads from the box between the valves. An arm 38 is centrally mounted on a rock shaft 39 suitably journaled in the casing 34. One end of this arm is connected to the valve assembly by a link 40, while the other end receives the stem 41 of a float 42.

The float and valve mechanism is, of course, subject to variation, but the structure shown has certain advantages. Directly over the valves and the valve box, a bell nipple 43 is screwed into the bottom of the casing. All sand entering the casing and settling therein will be trapped in this nipple and cannot lodge on the valve seats. A gate valve 44 is mounted on the lower end of the nipple and by opening this valve the trap may be cleaned.

On the outer end of the rock shaft 39 is secured one end of a counter-balancing lever 45, as is shown in Figure 3. A weight 46 is adjustably mounted on said lever so as to counterbalance the valves 36 and permit the float 42 to freely operate.

It will be seen that when the oil rises above the oil level indicated by the dotted line in Figure 1, the float 42 will rise and thus open the valves 36 whereby oil will be discharged into the pipe 37. When the oil reaches the normal level, the valves will be closed. A certain amount of sand and extraneous matter will collect on the bottom 11, and for removing this an elbow 47 connected in the collar 48 overhangs the bottom. The collar 48 is secured in the wall of the tank 10 and is connected to a drain pipe 49 through which the extraneous matter and sand may be drawn out.

This separator is particularly designed for use with pumping wells and flowing wells having low gas volumes and comparatively small production. The fluids will be given sufficient travel to extract the oil, and the gas when discharged will be substantially free from mist. The separator can be economically constructed and is easy and simple to install, as well as to operate.

Various changes in the size and shape of the different parts, as well as modifications and alterations, may be made within the scope of the appended claims.

What I claim is:

1. In a separator, a tank, scrubbing shells mounted one within the other in the upper portion of the tank and having inlets at their upper portions, a drain pipe extending from the shells to the lower portion of the tank, a gas pipe leading from the inner shell, an influent pipe entering the tank below the shells at mid-height of the tank, a diverter at the influent entrance for directing the influent circumferentially within the tank, a valve casing open to the oil at the bottom of the tank, a valve box in the casing, valves in the box, a sand trap under the box and valves, an oil discharge pipe leading from the box, and a float in the tank connected with the valves.

2. In a separator, a tank, scrubbing shells mounted one within the other in the upper portion of the tank and having inlets at their upper portions, a drain pipe extending from the shells to the lower portion of the tank, a gas pipe leading from the inner shell, an influent pipe entering the tank below the shells at mid-height of the tank, a diverter at the influent entrance for directing the influent circumferentially within the tank, a valve casing open to the oil at the bottom of the tank, a valve box in the casing, valves in the box, a sand trap under the box and valves, an oil discharge pipe leading from the box, a float in the tank connected with the valves, the inlet of the inner shell being remote from the inlet of the outer shell, and deflectors within the shells at each inlet for directing the fluids circumferentially therein.

3. In a separator, a tank, scrubbing shells one within the other mounted in the upper portion of the tank and having inlets at their upper portions, a drain pipe extending from the shells to the lower portion of the tank, a gas pipe leading from the inner shell, an influent pipe entering the tank below the shells at mid-height of the tank, a valve casing open to the oil at the bottom of the tank, a valve box in the casing, valves in the box, a sand trap under the box and valves, an oil discharge pipe leading from the box, and a float in the tank connected with the valves.

4. In a separator for gas and liquids, a tank, scrubbing means in the upper portion of the tank, a drain pipe extending from said scrubbing means, a gas outlet leading from said scrubbing means, an influent pipe connected with the tank, a valve casing open to the oil at the bottom of the tank, a valve box integral with the casing and mounted therein, the box having a smooth exterior and also being provided with valve openings in its top and bottom, valves engaging in the openings of the box, an oil discharge pipe leading from the box, a cleanout connection in the bottom of the casing under the bottom valve, and a float in the tank connected with the valves.

In testimony whereof I affix my signature.

JAY P. WALKER.